(Model.)
J. M. WEBB.
Churn.
No. 237,148.                              Patented Feb. 1, 1881.
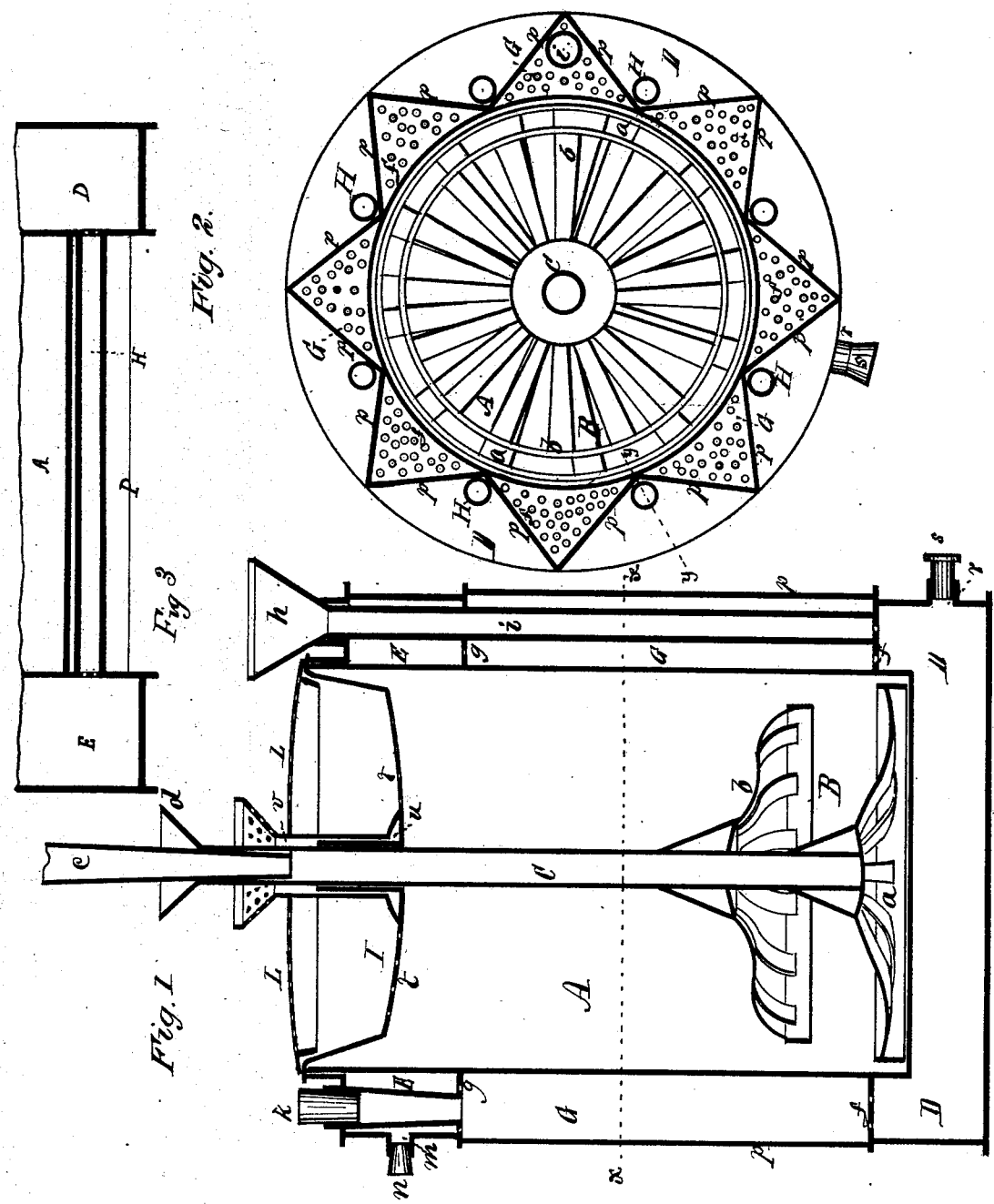
Witnesses,
Geo. Binkenburg
A. S. Brown
Inventor,
Jacob M. Webb
By J. S. Brown,
his attorney.
N. PETERS, PHOTO-LITHOGRAPHER, WASHINGTON, D.C.

United States Patent Office.

JACOB M. WEBB, OF SOMERVILLE, TENNESSEE.

CHURN.

SPECIFICATION forming part of Letters Patent No. 237,148, dated February 1, 1881.

Application filed September 15, 1880. (Model.)

*To all whom it may concern:*

Be it known that I, JACOB M. WEBB, of Somerville, in the county of Fayette and State of Tennessee, have invented an Improved Churn; and I do hereby declare that the following is a full and exact description thereof, reference being had to the accompanying drawings, making part of this specification—

Figure 1 being a central vertical section of the churn; Fig. 2, a horizontal section thereof in a plane indicated by the line $x\ x$, Fig. 1; Fig. 3, a partial vertical section in a plane indicated by the line $y\ y$, Fig. 2.

Like letters designate corresponding parts in all of the figures.

The purpose of my invention is to produce a churn which shall be expeditious as well as uniform in its operation, and with which the cream can be perfectly regulated in temperature, either by warming with heated water and steam or by cooling with cold water. Other special improvements will be described in order.

The accompanying drawings represent a dasher-churn with a vertically-reciprocating dasher. The body or cream-receptacle A of the churn is conveniently made of cylindrical shape, and the dasher B is made of corresponding shape. The dasher is double, the lower part, $a$, nearly filling the diameter of the churn-body A, with its rim, with radial upwardly-concave flat arms, alternating with spaces. The upper part, $b$, of the dasher is situated a little distance above the part $a$, is smaller than said lower part in diameter, and has similar radial arms, but curved convexly upward. Together the two parts of the dasher act very efficiently, not only cutting and dividing the cream, but commingling and agitating it thoroughly, as they act reversely— one to force the cream outward as the other does inward—and these actions are reversed as the motions up and down are reversed.

The handle or staff C of the dasher is made hollow or tubular—at least the part which enters the churn is so made. The upper or outer removable part, $c$, may be made tubular or solid, as preferred. The use of this hollow dasher-staff is to contain hot or cold water in case the cream is a little too cold or a little too warm, without resorting to more painstaking means for the purpose. The water is poured into the upper end of the hollow part of the staff, where it has, or may have, a widened mouth, $d$, for convenience in pouring the water into the tube.

In seasons or at times when more effectual or powerful means are required, I warm or cool the cream by the following means, as represented in the drawings: Around the lower end of the churn-body A, and under the same, is a water-receptacle, D, substantially as shown; and around the upper end of the said churn-body or cream-receptacle is another water-chamber, E, being annular in form and covering the churn-body. Between these two chambers, around all the remaining body of the churn, is a chamber or compartment, G, or rather, and preferably, several compartments, G G, communicating at their lower ends with the chamber D through perforated partitions $f\ f$, and at their upper ends similarly communicating with the upper chamber, E, by perforated partitions $g\ g$. The hot or cold water is first introduced into the lower chamber, D, without first coming in contact with the cream-receptacle, by first being poured into a funnel, $h$, and thence passing through a conducting-tube, $i$, down through one of the compartments G into the said chamber D. Here the water first spreads out below the cream-receptacle and heats the whole bottom alike, and more moderately than if poured directly around the cream-receptacle. Then, as the water continues to be poured into the lower chamber, D, it gradually rises through the retarding perforated partitions $f\ f$ into the compartments or spaces G G around the body of the churn, and thence through the other retarding perforated partitions $g\ g$ into the upper chamber, E. If, then, the heat is to be still further increased, water may continue to be poured into the funnel $h$, and one or more stoppers, $k$, which close tubes $l$, extending upward from the chambers or compartments G G, may be removed and the heat-spent water allowed to flow out, or the water may be allowed to flow out through an aperture, $m$, opening from the upper chamber, E, ordinarily closed by a stopper, $n$; but once filling all the chambers and compartments D E G G suffices for sufficiently heating or cooling the cream, the water is retained therein, and a circulation and even distribution of the water is kept up in the following manner:

The preferable mode of constructing the compartments G G is by making the outer wall, p, of a series of inclined faces horizontally, terminating alternately in outer and re-entrant angles, as shown in Fig. 2. Not only does this give additional radiating-surface to the wall, to quickly correct the effect if the water is too hot for the cream, but the re-entrant angles enable me to locate near but outside of the same a series of small tubes, H H, extending from the lower chamber, D, to the upper chamber, E, and communicating interiorly respectively with both, as shown in Fig. 3. Thus these tubes are outside, in the open air, and yet entirely shielded and out of the way. Now, suppose warm water is used for raising the temperature of the cream in the churn. It is desirable that the water should circulate all around the cream-receptacle and with nearly even temperature. The water in the bottom or lower chamber, D, is generally the warmest, from the natural effect of its circulation; hence it will gradually rise up through the compartments G G into the upper chamber, E, and the water in the outer tubes, H H, becoming somewhat cooled, descends into the lower chamber, D, so that the circulation is continual. If cold water is used in a warm room the circulation is the same as above, only it is reversed in direction.

The water is drawn off from the chambers and compartments D E G G through an outlet, r, in one side of the chamber D, and closed by a plug, s.

For a cover to the churn-body or cream-receptacle, I employ the following construction: First, there is a flaring dish or deep concave, I, resting, by a suitable flange, in the top of the churn-body. This dish has perforations in the bottom t only, and not in the flaring sides. In the center of this dish is an upright tubular bearing, u, in which the staff or handle of the dasher moves up and down. Over and upon this dish-like cover is another cover, L, finely perforated, and provided with a bearing, v, in which the dasher-staff moves, and terminating at the top with a funnel-shaped perforated top. The advantages and uses of this construction are, first, that no cream can escape through it, because what may be driven up through the first perforations cannot be driven through the fine perforations in the upper cover, because the force is spent and cannot strike with sufficient force and body to pass through the same; second, a free circulation of air through both covers is kept up into the body of the churn; third, the upper cover excludes dust and other impurities, while the lower cover or dish drains back all the cream into the cream-receptacle, and excludes any extraneous matter that may possibly get therein.

What I claim as my invention, and desire to secure by Letters Patent, is—

1. The combination of the upper and lower water-chambers, E D, the intermediate compartments G G, bounded by the horizontally-oblique walls p p, terminated alternately by projecting and re-entrant angles, and the cream-receptacle A, substantially as and for the purpose herein specified.

2. The combination of the upper and lower chambers, E D, intermediate compartments G G, within the angular wall p, and the outer tubes, H H, substantially as and for the purpose herein specified.

3. In combination with the chambers E D, compartments G G, and tubes H, arranged as described, the feeding-tube i and perforated partitions f f and g g, whereby the circulation of the water is regulated, substantially as described.

4. The combination of the churn-body A, the dish-formed cover I, having imperforated sides and perforated bottom, and a finely-perforated cover, L, upon the said cover I, substantially as and for the purpose herein specified.

The foregoing specification signed by me this 2d day of June, 1880.

JACOB M. WEBB.

Witnesses:
WM. C. OLD,
W. A. SMALL.